US009390291B2

(12) United States Patent
Cox et al.

(10) Patent No.: US 9,390,291 B2
(45) Date of Patent: Jul. 12, 2016

(54) SECURE KEY DERIVATION AND CRYPTOGRAPHY LOGIC FOR INTEGRATED CIRCUITS

(71) Applicant: Intel Corporation, Santa Clara, CA (US)

(72) Inventors: George W. Cox, Hillsboro, OR (US); David Johnston, Beaverton, OR (US); Jiangtao Li, Beaverton, OR (US); Anand Rajan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/730,829

(22) Filed: Dec. 29, 2012

(65) Prior Publication Data

US 2014/0189365 A1    Jul. 3, 2014

(51) Int. Cl.
  *G06F 21/72* (2013.01)
  *G06F 21/73* (2013.01)
  *H04L 9/08* (2006.01)
  *G09C 1/00* (2006.01)

(52) U.S. Cl.
  CPC ............ *G06F 21/72* (2013.01); *G06F 21/73* (2013.01); *G09C 1/00* (2013.01); *H04L 9/0866* (2013.01); *H04L 2209/12* (2013.01)

(58) Field of Classification Search
  CPC ........... G06F 21/72; G06F 21/73; G09C 1/00; H04L 9/0866; H04L 2209/12
  USPC ................................................ 713/189–194
  See application file for complete search history.

(56) References Cited

U.S. PATENT DOCUMENTS

| 7,373,506 | B2 * | 5/2008 | Asano et al. | 713/168 |
|---|---|---|---|---|
| 7,685,436 | B2 * | 3/2010 | Davis et al. | 713/192 |
| 7,773,754 | B2 * | 8/2010 | Buer et al. | 380/277 |
| 7,873,830 | B2 * | 1/2011 | Fayad et al. | 713/169 |
| 7,904,731 | B2 * | 3/2011 | Devadas et al. | 713/189 |
| 8,386,801 | B2 * | 2/2013 | Devadas et al. | 713/189 |
| 8,402,401 | B2 * | 3/2013 | Chakraborty et al. | 716/102 |

(Continued)

FOREIGN PATENT DOCUMENTS

KR   10-2011-0118273 A   10/2011
WO   2014/105146 A1   7/2014

OTHER PUBLICATIONS

International Search Report and Written Opinion received for PCT Patent Application No. PCT/US2013/046636, mailed on Apr. 15, 2014, 5 pages.

(Continued)

*Primary Examiner* — Joseph P Hirl
*Assistant Examiner* — J. Brant Murphy
(74) *Attorney, Agent, or Firm* — Vecchia Patent Agent, LLC

(57) ABSTRACT

A processor of an aspect includes root key generation logic to generate a root key. The root key generation logic includes a source of static and entropic bits. The processor also includes key derivation logic coupled with the root key generation logic. The key derivation logic is to derive one or more keys from the root key. The processor also includes cryptographic primitive logic coupled with the root key generation logic. The cryptographic primitive logic is to perform cryptographic operations. The processor also includes a security boundary containing the root key generation logic, the key derivation logic, and the cryptographic primitive logic. Other processors, methods, and systems are also disclosed.

29 Claims, 15 Drawing Sheets

(56) References Cited

U.S. PATENT DOCUMENTS

| | | | |
|---|---|---|---|
| 8,489,660 B2* | 7/2013 | Herbert et al. | 708/251 |
| 8,516,269 B1* | 8/2013 | Hamlet et al. | 713/189 |
| 8,590,010 B2* | 11/2013 | Fainstein et al. | 726/2 |
| 8,639,949 B2* | 1/2014 | Van Rijnswou | 713/193 |
| 2006/0059369 A1* | 3/2006 | Fayad et al. | 713/189 |
| 2006/0133607 A1 | 6/2006 | Forehand et al. | |
| 2006/0271792 A1* | 11/2006 | Devadas et al. | 713/189 |
| 2006/0271793 A1* | 11/2006 | Devadas et al. | 713/189 |
| 2008/0098233 A1* | 4/2008 | Dewkett et al. | 713/189 |
| 2010/0169636 A1 | 7/2010 | Davis et al. | |
| 2010/0199104 A1 | 8/2010 | Van et al. | |
| 2010/0241874 A1* | 9/2010 | Vergnes et al. | 713/193 |
| 2010/0246827 A1 | 9/2010 | Lauter et al. | |
| 2010/0250936 A1* | 9/2010 | Kusakawa et al. | 713/169 |
| 2010/0254536 A1 | 10/2010 | Dellow | |
| 2011/0161586 A1* | 6/2011 | Potkonjak et al. | 711/122 |
| 2012/0072737 A1* | 3/2012 | Schrijen et al. | 713/189 |
| 2012/0137137 A1 | 5/2012 | Brickell et al. | |
| 2013/0129087 A1* | 5/2013 | Qi | G06F 21/602 380/44 |
| 2013/0147511 A1* | 6/2013 | Koeberl et al. | 326/8 |
| 2014/0010371 A1* | 1/2014 | Khazan et al. | 380/278 |
| 2014/0013123 A1* | 1/2014 | Khazan et al. | 713/189 |
| 2014/0032933 A1* | 1/2014 | Smith et al. | 713/193 |
| 2014/0189890 A1* | 7/2014 | Koeberl | G06F 21/70 726/34 |

OTHER PUBLICATIONS

International Preliminary Report on Patentability and Written Opinion Received for PCT Patent Application No. PCT/US2013/046636, mailed on Jul. 9, 2015, 9 pages.

Office Action received for Korean Patent Application No. 10-2015-7014039, mailed on Mar. 15, 2016, 7 pages of English Translation and 8 pages of Korean Office Action.

* cited by examiner

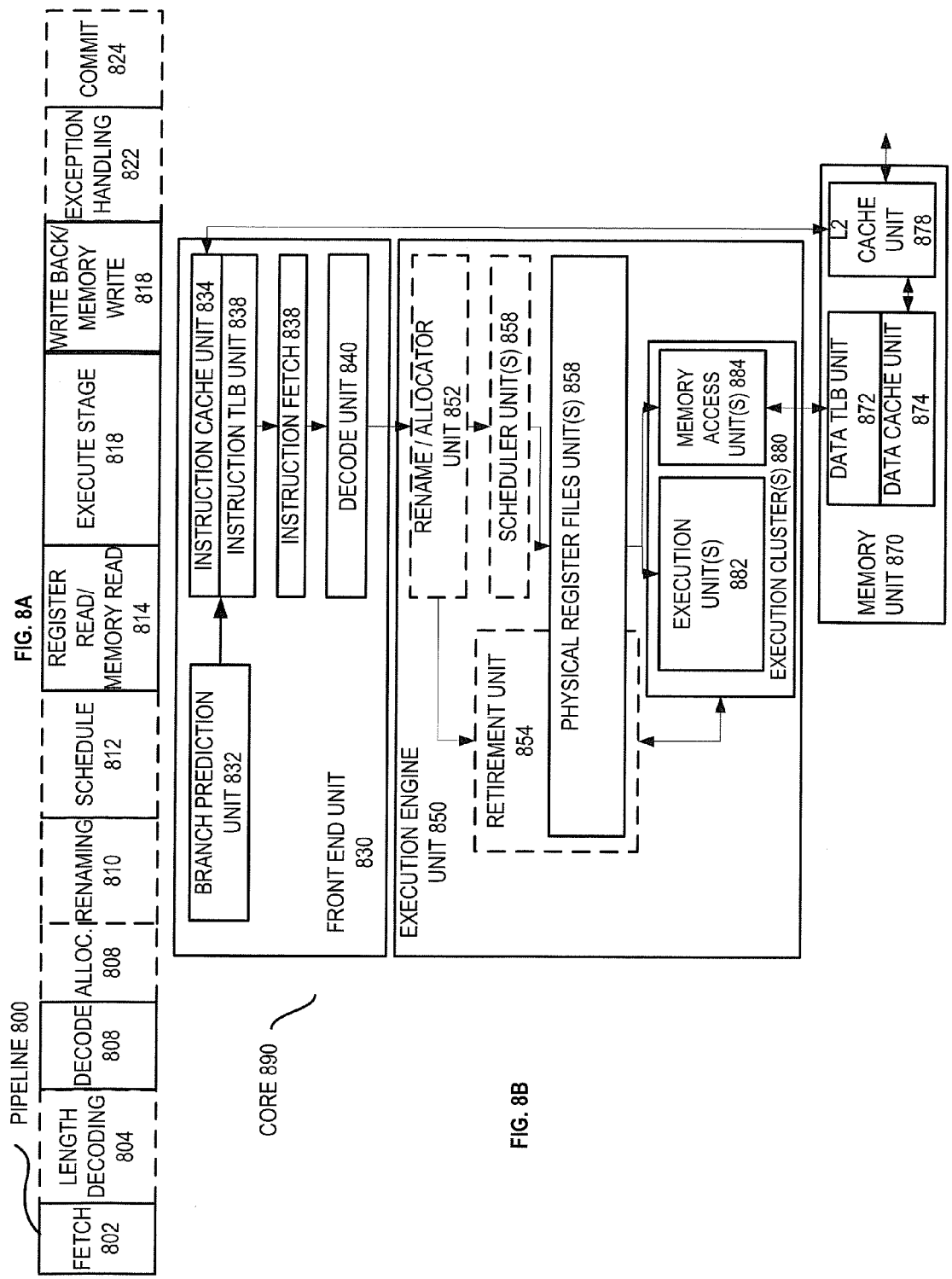

SECURE KEY DERIVATION AND CRYPTOGRAPHY LOGIC FOR INTEGRATED CIRCUITS

BACKGROUND

1. Field

Embodiments relate to the field of integrated circuits. In particular, embodiments relate to the field of security in integrated circuits.

2. Background Information

Desktop computers, laptop computers, netbooks, tablets, smart phones, cell phones, multimedia content players, smart televisions, set top boxes, servers, and various other types of consumer electronics or electronic devices, are commonly used to handle sensitive or secure information. By way of example, the sensitive or secure information may include financial information, confidential documents, personal emails, digital rights protected content, etc.

Processors, chipset components, systems-on-chips (SoCs), security-related integrated circuits, and other types of integrated circuits used in such electronic devices are commonly provisioned with secrets, such as secret keys, which are used to protect the sensitive or secure information. For example, the secret keys may be used to protect the information through encryption/decryption.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

DETAILED DESCRIPTION

Disclosed herein are secure key derivation and cryptography logic for processors and other integrated circuits. In the following description, numerous specific details are set forth (e.g., specific cryptographic algorithms, logic partitioning/integration details, logic implementations, sequences of operations, types and interrelationships of system components, and the like). However, it is understood that embodiments of the invention may be practiced without these specific details. In other instances, well-known circuits, structures and techniques have not been shown in detail in order not to obscure the understanding of this description.

Figure 1:
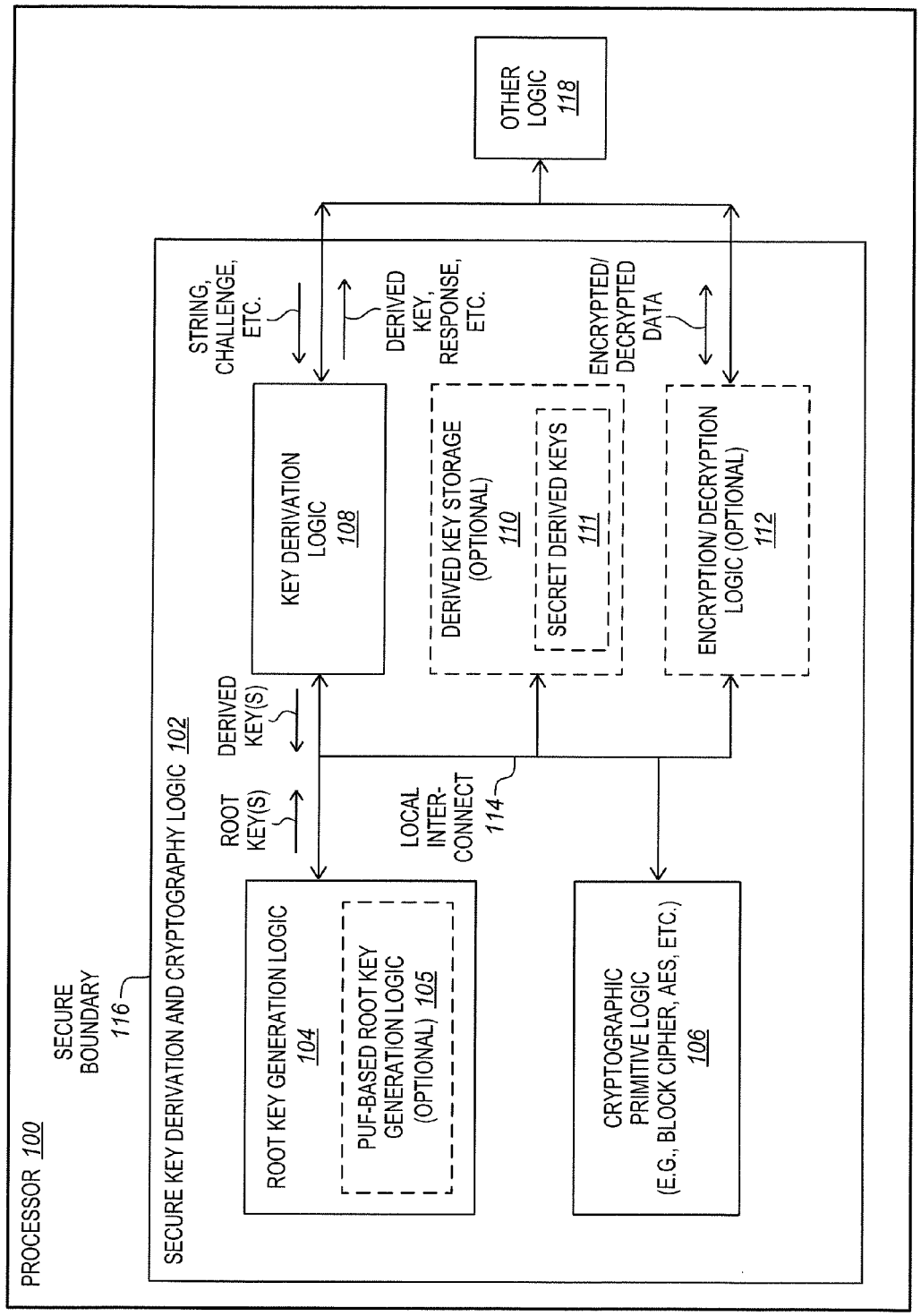
FIG. 1 is a block diagram of an embodiment of a processor having secure key derivation and cryptography logic.

FIG. 1 is a block diagram of an embodiment of a processor 100 having secure key derivation and cryptography logic 102. In some embodiments, the processor may be a general-purpose processor (e.g., of the type used in desktop, laptop, netbook, tablet, smartphone, cell phone, server, smart television, set-top box, and like computing devices). Alternatively, the processor may be a special-purpose processor. Examples of suitable special-purpose processors include, but are not limited to, cryptographic processors, security processors, network processors, communications processors, co-processors, embedded processors, and digital signal processors (DSPs), to name just a few examples.

The processor includes the secure key derivation and cryptography logic 102. The secure key derivation and cryptography logic includes root key generation logic 104, cryptographic primitive logic 106, key derivation logic 108, optional derived key storage 110, and optional encryption/decryption logic 112. These components are all coupled with, and coupled together by, a local interconnect 114. The secure key derivation and cryptography logic may be entirely contained on-die and/or on-processor (e.g., none of the processing may need to be performed by software loaded onto the processor form memory). In some embodiments, the secure key derivation and cryptography logic may be implemented predominantly, almost entirely, or entirely in hardware on-die and/or on-processor. In some embodiments, the secure key derivation and cryptography logic may be implemented as a substantially vertical intellectual property (IP) block that is substantially reusable and substantially scalable. In some embodiments, the vertical IP block may be designed to be portable from one processor design to another, scalable, reusable, substantially self-contained and connectable to other components through well defined interfaces, which may help the vertical IP block to be reused from one design to another. In some embodiments, all components of the secure key derivation and cryptography logic may be substantially self-contained within a physical and/or logical boundary 116 without secure or secret information leaving the boundary.

The secure key derivation and cryptography logic 102 includes root key generation logic 104. The root key generation logic is operable to generate one or more secret or secure root keys. In some embodiments, the root key may not leave the boundary of the security logic. The root key(s) may be used to derive one or more other secret or secure derived keys. The secret or secure derived key(s) may be used for various purposes (e.g., performing encryption/decryption, providing a responses to challenges, etc.), as will be described further below. As shown, in some embodiments, the root key generation logic may optionally include a physically unclonable function (PUF)-based root key generation logic 105. PUF will be described in further detail below. The PUF-based root key generation logic may be operable to generate one or more secret or secure PUF-based root keys. As another option, in some embodiments, the root key generation logic may optionally include a fuse-based root key generation logic (not shown). The fuse-based root key generation logic may be operable to generate one or more secret or secure fuse-based root keys. In still other embodiments, a combination of PUF-based and fuse-based root key generation logic may be used. Alternatively, substitutes for fuses and PUF, or other sources of substantially static and substantially entropic/random bits may be used.

The secure key derivation and cryptography logic 102 also includes cryptographic primitive logic 106. In some embodiments, the cryptographic primitive logic may include block cipher logic (e.g., a block cipher engine or module) operable to perform block ciphers and/or cryptographic hash function logic operable to compute a hash operation (e.g., secure hash algorithm logic). Block ciphers generally represent deterministic cryptographic algorithms that operate on fixed-length groups of bits called blocks with an unvarying transformation with a symmetric key that is used for both encrypting and decrypting data. As an example, the block cipher logic may include Advanced Encryption Standard (AES) logic (e.g., an AES engine or module). AES is a U.S. National Institute of Standards and Technology (NIST) approved cryptographic algorithm that is described further in U.S. Federal Information Processing Standards (FIPS) PUB 197, published on Nov. 26, 2001. Alternatively, other block cipher on-die logic implemented algorithms may optionally be used instead of AES (e.g., others approved by NIST or FIPS). In some embodiments, the cryptographic primitive logic may be implemented predominantly, almost entirely, or entirely in hardware within the boundary 116 of the secure key derivation and cryptography logic and on-die and/or on-processor.

The cryptographic primitive logic may be used for various purposes. For example, in some embodiments, the cryptographic primitive logic may be used to encrypt and decrypt data. As another example, the cryptographic primitive logic may be used to support other cryptographic logic or protocols within the secure key derivation and cryptographic logic. For example, the cryptographic primitive logic may be used to support key derivation logic 108 and/or key derivation, as will be described further below. As another example, the cryptographic primitive logic may be used to support entropy extraction and/or PUF bit conditioning performed in conjunction with PUF-based root key generation, as will be described further below. As yet another example, the cryptographic primitive logic may be used to support encryption/decryption logic 112 and/or encryption/decryption, as will be described further below. As a still further example, the cryptographic primitive logic may be used to support digital random number generation (DRNG), as will be described further below.

Referring again to FIG. 1, the secure key derivation and cryptography logic 102 also includes key derivation logic 108 (e.g., a key derivation engine or module). The key derivation logic may be operable to derive one or more derived keys from the one or more root keys. By way of example, the one or more derived keys may be generated or derived by evaluating an on-die logic implemented key derivation algorithm with the one or more root keys. Different key derivation algorithms are suitable for different embodiments. Examples of suitable key derivation algorithms include, but are not limited to, NIST SP800-108, SP800-56C, key derivation algorithms based on hash functions, key derivation algorithms based on block ciphers, other NIST or FIPS approved key derivation algorithms, and the like. In some embodiments, the key derivation logic may be implemented predominantly, almost entirely, or entirely in hardware within the boundary 116 of the secure key derivation and cryptography logic and on-die and/or on-processor. In some embodiments, root key generation logic and key derivation logic may be implemented in hardware within a security certified boundary as a vertical intellectual property block. Advantageously, the one or more derived keys may be cryptographically derived from the one or more root keys (e.g., one or more PUF based root keys). In one aspect, this may be used to provide multiple different derived keys without needing to have multiple different sets of PUF or fuses, which would otherwise tend to increase the size, manufacturing cost, and power consumption of the logic.

In some embodiments, the key derivation logic 108 may be used to generate or derive keys for various components (e.g., other logic 118) of the processor 100 external to the secure key derivation and cryptographic logic 102 and/or various components of a system in which the processor is deployed. For example, in some embodiments, the other components (e.g., the other logic 118) may provide additional bits or data that is used to evaluate the on-die logic implemented key derivation algorithm. As one example, a derived key may be generated by evaluating the key derivation algorithm with one or more root keys and a set of bits (e.g., a derivation string, a personalization string, etc.) provided by the other component (e.g., other logic 118) that is requesting the derived key. By way of example, the other logic 118 may represent various different types of key utilization and/or security logic found in processors or other integrated circuits. Examples of such logic include, but are not limited to, encryption logic, decryption logic, cryptographic logic or modules, trusted platform modules, security engines, security controllers, crypto-processors, crypto-coprocessors, or the like.

Other uses of the key derivation logic 108 are also contemplated. For example, in some embodiments, a derived key may be used as a response provided as an output in response to a challenge received as an input. For example, a challenge (e.g., a set of bits) may be provided to the key derivation logic by another component (e.g., other logic 118). The key derivation logic may evaluate the key derivation algorithm with one or more root keys and the challenge. The derived key may represent the response to the challenge. Advantageously, the response is cryptographically derived based on a root key (e.g., a PUF based root key). Another possible way to provide challenge-response functionality would be to provide the challenge directly to PUF cells and provide the response directly from the PUF cells (perhaps with error correction)

without going through cryptographic key derivation or processing. However, the later approach generally has certain drawbacks. For one thing, the number of challenge-response pairs available from PUF cells are generally limited (e.g., in static random access memory (SRAM) type PUF the challenges may represent the physical addresses such that a limited number of responses are possible). Moreover, in arbiter-type PUF, a large number of challenge-response pairs may tend to allow modeling attacks. For another thing, the response from PUF cells generally tends to be noisy. In contrast, using derived keys as a response to a challenge may allow a large number, or even an almost unlimited number, of error-free challenge-response pairs. This challenge-response capability may be useful for various purposes, such as, for example, for authentication, counterfeit detection, and other purposes known in the arts.

In some embodiments, the key derivation logic 108 may be used to derive one or more secret or secure keys, which are to be retained securely within the boundary 116 of the secure key derivation and cryptographic logic 102, from the one or more root keys. For example, a secret or secure derived key may be generated by evaluating the key derivation algorithm with one or more root keys potentially combined with additional bits (e.g., from fuses, stored in RAM, otherwise preserved within the cryptographic logic, etc.). In some embodiments, these one or more secret or secure keys 111 may be stored in an optional derived key storage 110. In some embodiments, these one or more secret or secure keys 111 may include one or more encryption and/or decryption keys that may be used by encryption and/or decryption logic 112. In some embodiments, not only are one or more root keys (e.g., PUF-based root keys) not exposed outside of the boundary 116, but also one or more secret or secure derived keys, which have been derived based on the one or more root keys, are also not exposed outside of the boundary.

Referring again to FIG. 1, the secure key derivation and cryptography logic 102 also includes optional encryption and/or decryption logic 112 (e.g., an encryption and/or decryption engine or module). The encryption/decryption logic may be operable to encrypt and/or decrypt data. Examples of suitable encryption/decryption algorithms include, but are not limited to, AES-ECB, AES-CBC, AES-CTR, other block cipher algorithms, other NIST or FIPS approved encryption/decryption algorithms, or the like. As compared to the cryptographic primitive logic 106, the encryption/decryption logic 112 generally operates on larger and flexibly sized data, whereas the cryptographic primitive logic generally operates on smaller and fixed sized blocks (e.g., 64-bit blocks, 128-bit blocks, etc.), although this is not required. In some embodiments, the encryption/decryption logic may be implemented predominantly, almost entirely, or entirely in hardware within the boundary 116 of the secure key derivation and cryptography logic and on-die and/or on-processor. In other embodiments, the encryption/decryption logic may optionally be omitted if the secure key derivation and cryptography logic is not desired to perform encryption and/or decryption. For example, this may be the case if the logic 102 is used for challenge response uses but not for encryption/decryption.

In various embodiments, the encryption/decryption logic may use root keys from the root key generation logic 104, keys derived from root keys by the key derivation logic 108, derived keys 111 from the derived key storage 110, or other keys. As one example, in some embodiments, a component (e.g., the other logic 118) may provide a set of bits (e.g., a derivation string, a personalization string, etc.) and plaintext data to be encrypted. The key derivation logic may derive a key based on a root key and the set of provided bits (e.g., the derivation or personalization string). Then the encryption/decryption logic may encrypt the plaintext data with the derived key and provide the encrypted data (e.g., ciphertext) back to the requesting component. As another example, in some embodiments, a component (e.g., the other logic 118) may provide a set of bits (e.g., a derivation string, a personalization string, etc.) and encrypted data (e.g., ciphertext) to be decrypted. The key derivation logic may derive a key based on a root key and the set of provided bits (e.g., the derivation or personalization string). Then the encryption/decryption logic may decrypt the encrypted data with the derived key and provide the unencrypted or plaintext data (e.g., ciphertext) back to the requesting component.

As mentioned above, the root key generation logic 104 of FIG. 1 may optionally include fuse-based root key generation logic. One potential drawback to the use of fuses, depending upon the particular implementation and the need for security, is that secretes stored in fuses may in some cases be insufficiently secure due in part to being too simple to reverse engineer. For example, an integrated circuit may be physically inspected rigorously in a lab in order to determine the values of the keys stored in the fuses. Allowing the keys stored in the fuses to be determined may compromise, or at least contribute to compromising, the security of the integrated circuit and the secure or sensitive data it processes. In some embodiments, PUFs may be used instead of and/or in addition to fuses in order to help increase the level of security.

Figure 2:
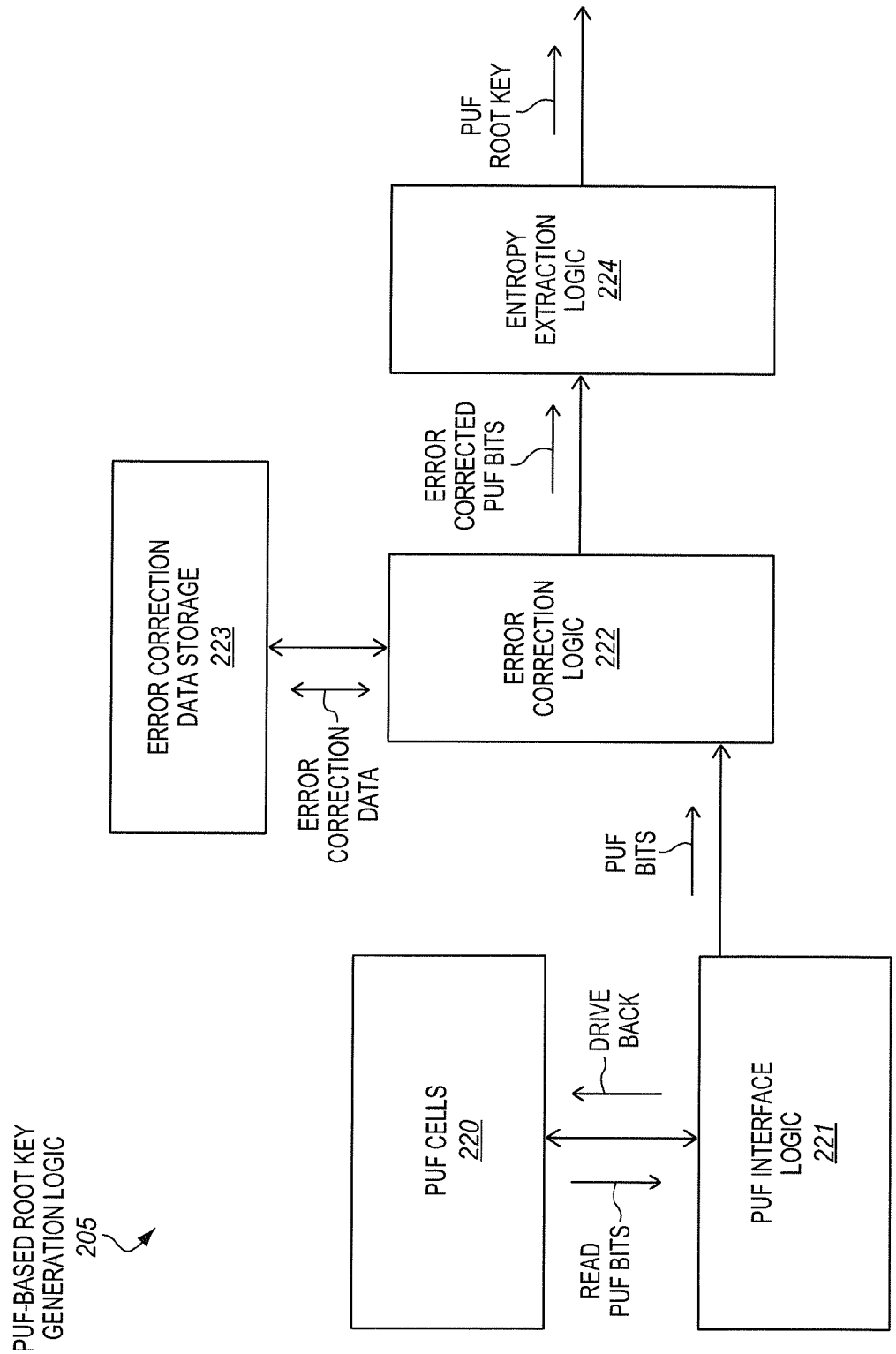
FIG. 2 is a block diagram of an embodiment of a PUF-based root key generation system.

FIG. 2 is a block diagram of an embodiment of a PUF-based root key generation system 205. In some embodiments, the PUF-based root key generation system of FIG. 2 may be used in the processor and/or secure key derivation and cryptography logic of FIG. 1. Alternatively, the PUF-based root key generation system of FIG. 2 may be used in a similar or entirely different processor and/or secure key derivation and cryptography logic. Moreover, the processor and/or secure key derivation and cryptography logic of FIG. 1 may use either the same, similar, or entirely different PUF-based root key generation system than that of FIG. 2.

The PUF-based root key generation system 205 includes a set of PUF cells 220. The PUF cells may also be referred to herein simply as PUFs. PUFs are sometimes also known in the art as physical one-way functions (POWFs), or by other names. Each of the PUF cells may be operable to generate a corresponding PUF bit. The number of the PUF cells or PUF bits may be any conventional or appropriate number without limitation to the scope of the invention. Commonly, in the case of a relatively highly secured general-purpose processor, there may be anywhere from on the order of tens, to hundreds, to many thousands of PUF cells and/or PUF bits, although the scope of the invention is not limited to any number. Natural fabrication process variations may result in PUF bits that are substantially unique per device (e.g., substantially platform unique). The PUF bits also tend to be substantially static for each device across the life of the device and substantially entropic or random. The PUF bits may be the source from which the PUF root keys are obtained.

A wide variety of different types of PUF 220 known in the art may be used. It tends to be difficult to place a precise circumference around all of the different types of devices, circuitry, and physical systems that are known in the arts to be PUFs. This discussion is not intended, and should not be used, to exclude devices, circuitry, and physical systems that regarded to be PUFs. Most PUFs represent functions (e.g., they produce an output/response from an input/challenge), which are physical (e.g., embedded in a medium, include integrated circuitry, include structures or micro-structures (e.g., microelectronic structures), include materials, are embodied in a physical medium, etc.), and which are substantially unclonable. The term substantially unclonable means that it would be extremely difficult if not infeasible, even for the manufacturer of a set of PUFs, to subsequently manufacture another copy of the set of PUFs that would have the same salient characteristics (e.g., that would provide the same output/response (e.g., PUF bits)), even using the same manufacturing process. The particular binary values of the PUF bits generated by the PUF cells generally depend upon the physical characteristics of the corresponding PUF cells, which in turn depend on the particular manufacturing process used to manufacture the corresponding PUF cells, including on generally uncontrollable process variations encountered during the manufacturing process, which are for practical purposes impractical or infeasible to reproduce precisely.

In some embodiments, the PUF 220 may represent silicon intrinsic PUF, or more generally semiconductor intrinsic PUF, or complementary metal oxide semiconductor (CMOS) PUF. In some embodiments, the PUF cells may have been manufactured using a CMOS manufacturing process that is also used to manufacture transistors and/or other logic of the integrated circuit. In some embodiments, each of the PUF cells may be embedded within an integrated circuit substrate, for example including portions of integrated circuitry and/or structures or devices formed of semiconductors and/or structures or devices formed by a CMOS process. Examples of suitable types of PUFs include, but are not limited to, delay PUFs (e.g., intrinsic PUFs based on digital delay measurements), delay loop PUFs, memory PUFS (e.g., intrinsic PUFs based on settling state of digital memory elements), SRAM PUFs, cross-coupled PUFs, arbiter PUFs (e.g., PUFs based on MUXes and an arbiter), ring-oscillator PUFs, bistable ring PUFs, butterfly PUFs, latch PUFs, flip-flop PUFs, D-type flip-flop PUFs, coating PUFs, additional semiconductor or CMOS PUFs known in the arts, and combinations thereof. In the case of silicon, semiconductor, or CMOS PUFS, depending upon the particular type of PUF, the binary values of the PUF bits generated may tend to depend upon factors such as dopant concentrations in semiconductor materials, line widths of integrated circuits, layer thicknesses, variations from one region to the next, or the like, which depend in an unpredictable way upon manufacturing process variations.

Referring again to FIG. 2, the PUF-based root key generation logic 205 also includes PUF interface logic 221 to interface with the PUF cells 220. The PUF interface logic 221 may be operable to read PUF bits (e.g., a set of binary or bit values) from the PUF cells. In some embodiments, the PUF interface logic may optionally be operative to provide PUF driveback, although this is not required. The PUF driveback may take the value read from each PUF cell, invert it, and drive it back onto the PUF cell. Advantageously, this may help to cause the aging of the PUF cell to drive it further towards a defined or static state rather than towards an undefined or varying state.

Generally, when reading the PUF bits from the PUF cells the PUF bits generally tend to be reasonably static. For example, when reading PUF bits from the PUF cells multiple times, typically a vast majority of the PUF bits tend to have the same binary value from one read to the next. Some PUF bits referred to as the "weaker" PUF bits may tend to flip or change binary value from one read to the next more frequently than others. For example, a first read of five PUF cells may result in the PUF bits "01101," whereas a second read of the same five PUF cells may result in the PUF bits "01111." Notice that a PUF bit has flipped from binary-0 to binary-1 from the first to second reads. This represents a PUF bit error. When used for security, such PUF bit errors are generally undesirable (e.g., since they may cause different, unpredictable, or unrepeatable keys to be generated).

As shown, the PUF interface logic 221 may provide the PUF bits read from the PUF cells to error correction logic 222. The error correction logic may be operative to perform error correction on the PUF bits and correct any errors that may be present, at least up to a given level of errors. As shown, in some embodiments, the error correction logic may receive error correction data. This error correction data is sometimes also referred to as error correction code or helper data. In some embodiments, this error correction data may be stored in fuses, other non-volatile memory, or the like. In some embodiments, the error correction logic may be operative to generate and store the error correction data, for example at a time of manufacturing, for subsequent use. Subsequently, when PUF bits having errors are provided to the error correction logic, the error correction logic may be operative to use the error correction data to correct the errors, at least up to a certain level, in the PUF bits, in order to obtain error corrected PUF bits. Various error correction techniques known in the arts may be used. In some embodiments, the error correction logic is implemented entirely on-die and/or on-processor and predominantly, almost entirely, or entirely in hardware logic.

It is generally desirable for the PUF bits to have a sufficient level of entropy or randomness. When there is a high level of entropy or randomness, then the likelihood of an identical set of PUF bits from two different integrated circuits generally tends to be relatively low. For example, the PUF bits from a first set of five PUF cells may be "01101," the PUF bits from a second set of five PUF cells may be "10100," and the PUF bits from a third set of five PUF cells may be "10111," as just one example. Notice that the sets of PUF bits are different. When there is a relatively high level of entropy, there should be approximately equal likelihood of each bit having either a binary-0 or a binary-1, such that given enough sets of PUF bits, a string of PUF bits should approximately span all of the possible binary values to provide a relatively high level of randomness of values. When used for security, it is generally desirable for PUF bits to be at least reasonably entropic or random, since this helps to enhance security.

Referring again to FIG. 2, the error correction logic may provide the error corrected PUF bits to entropy extraction logic 224. The entropy extraction logic may be operative to perform entropy extraction on the error corrected PUF bits. The entropy extraction generally represents a conditioning that helps to encourage or promote entropy or randomness. Examples of suitable entropy extraction approaches include, but are not limited to, those based on an AES-CMAC algorithm, those based on block cipher algorithms, those based on message authentication codes, those based on hash functions, or other entropy extraction approaches known in the arts. In some embodiments, the entropy extraction logic is implemented entirely on-die and/or on-processor and predominantly, almost entirely, or entirely in hardware logic. The entropy extraction logic may provide an entropy extracted PUF bits representing a PUF root key as output.

It is to be appreciated that this is just one illustrative example of suitable PUF-based root key generation logic. Other embodiments may include more or less components to perform more or less processing of the PUF bits. For example, other embodiments may optionally omit the PUF driveback. As another example, other embodiments may optionally omit the entropy extraction (e.g., if the PUF bits are already ensured to be sufficiently entropic for the particular implementation). The PUF bits described above may be used in any of the embodiments disclosed herein for root key generation logic. Additionally, while PUF are often described herein, other embodiments may instead use fuses, or other static, entropic sources of bits suitable for root keys.

One advantage to the use of PUFs for security is that the PUF bits and/or PUF root keys generally tend to be significantly more secure and/or less vulnerable to discovery (e.g., through reverse engineering, physical attacks, etc.) than keys stored in fuses (and also ROM, RTL, tie-ups/tie-downs, and the like). The PUFs generate the PUF bits from which the root keys are obtained during runtime. In order to determine the PUF bits and/or PUF root key the integrated circuit or other device may need to be running or powered on and/or not altered in a way that would alter the values of the PUF bits. These factors tend to make it significantly more difficult to determine the values of the PUF bits and/or PUF root keys through reverse engineering. Advantageously, this may help to improve the security of the integrated circuits or devices as well as the sensitive information they are used to process. In addition, the PUF bits and/or PUF root keys may be known within the secure key derivation and cryptography logic on the integrated circuit but may not be known externally, in some cases even to the most trusted entities of the integrated circuit manufacturer, which may help to limit the responsibilities, risks, and liabilities of the manufacturer.

During manufacture it is common to test and/or debug integrated circuits and integrated circuit packages at various stages of manufacture. This may be done for various purposes, such as, for example, to test the integrated circuit substrate for proper operation, to detect bugs or defects, to attempt to fix bugs or defects, to sort properly functioning integrated circuits from improperly functioning integrated circuits that are to be discarded or reworked, to program data based on testing into the integrated circuit, etc. This testing or debugging may be done by integrated circuit test and/or debug equipment (e.g., a tester and prober) and/or other integrated circuit manufacturing equipment. By way of example, the equipment may have a set of electrical probes that are used to couple with exposed electrical contacts (e.g., pins) of the integrated circuit. The equipment may exchange electrical signals with the integrated circuit substrate through the probes and pins according to a test pattern. For example, the equipment may transmit electrical signals to the integrated circuit, and receive corresponding electrical signals in response, which may be analyzed as part of the testing or debugging. One challenge is that the equipment may not be as highly secure as desired. Potentially multiple employees (e.g., operators) or other people may have access to the equipment. There is a risk that an operator, employee, or other individual having access to the equipment (e.g., a tester and prober) may secretly install malicious software (e.g., a corrupted testing program) to attempt to obtain secret information (e.g., keys). Moreover, even outside of the manufacturing facility, attackers may attempt to use their own equipment to attempt to access secrets (e.g., keys) through the external contacts. If the secrets are discovered, it may compromise, or at least contribute to compromising, the security of the integrated circuit and/or the secret information processed therein.

Figure 3:
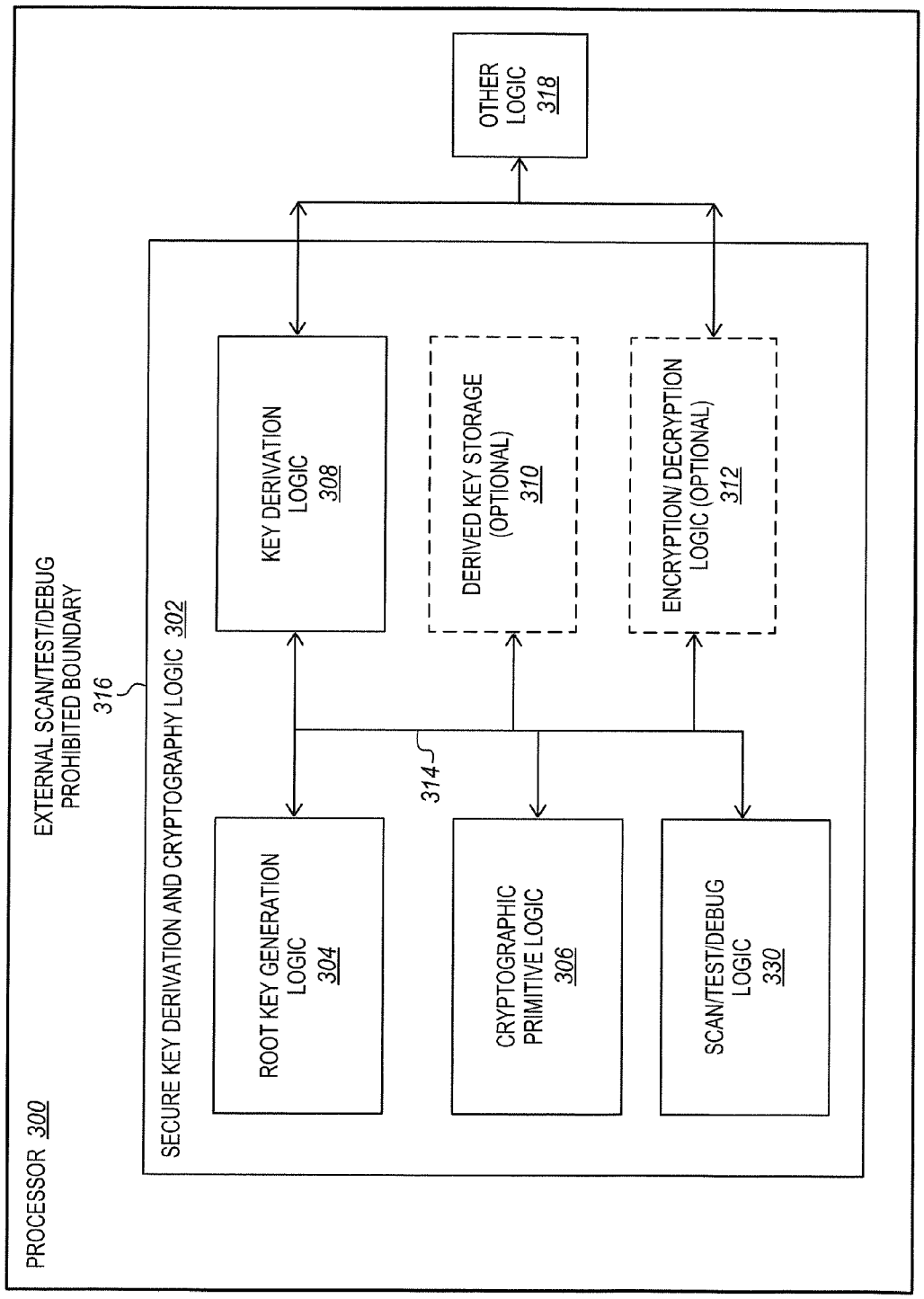
FIG. 3 is a block diagram of an embodiment of a processor having a secure key derivation and cryptography logic that optionally includes an embodiment of test and debug logic.

FIG. 3 is a block diagram of an embodiment of a processor 300 having a secure key derivation and cryptography logic 302 that optionally includes an embodiment of test and debug logic 330. The secure key derivation and cryptography logic 302 includes root key generation logic 304, a cryptographic primitive logic 306, optional key derivation logic 308, a derived key storage 310, optional encryption/decryption logic 312, and a local interconnect 314. The processor also includes other logic 318. Each of these components may optionally have the same or similar characteristics as the correspondingly named components of the processor 100 of FIG. 1. Moreover, in some embodiments, the root key generation logic 304 may be the same or similar to the logic of FIG. 2. To avoid obscuring the description primarily the different and/or additional structures and characteristics of the processor 300 of FIG. 3 will be described in detail below.

In some embodiments, the secure key derivation and cryptography logic 302 may be included within a physical and/or logical external test and/or debug prohibited boundary 316. In some embodiments, scanning, testing, and/or debugging of logic within the boundary 316 by entities external to the boundary 316 (e.g., a tester and prober, manufacturing equipment, an external scan chain, on-processor logic outside of the boundary, etc.) is prohibited or disabled (i.e., is not allowed to be performed). The boundary may represent an external scan prohibited or disabled boundary, an external test prohibited or disabled boundary, an external debug prohibited or disabled boundary, or the like. The external entities may not be allowed to examine or know the internal state of the logic within the boundary. For example, in some embodiments, there may be no lines, wires, or other interconnects and/or logic to allow the internal state of the logic inside the boundary to be accessed or examined through exposed or external contacts (e.g., pins, contact pads, etc.) of the processor. Similarly, in some embodiments, there may be no interconnects and/or logic to allow the internal state of the logic inside the boundary to be accessed or examined by on-die logic of the processor outside the boundary. By way of example, general chip-wide debug capabilities, such as scan-chains and chip-wide built in self test (BIST), may not be used within the boundary. By contrast, the external entities may be able to scan, test, or debug other logic of the processor outside of the boundary (e.g., logic 318). Optionally, if the secure key derivation and cryptography logic includes certain logic that does not have access to any secrets or secure information and could be scanned, tested, and/or debugged by the external entity without any significant risk of compromising security, then such logic may potentially and optionally be excluded from the prohibited boundary. Advantageously, this may help to prevent corrupted testing equipment, or other attacking entities from scanning the internal state of the secure key derivation and cryptography logic within the boundary and potentially obtaining secrets or secure information (e.g., root keys, derived keys, etc.) or trying to configure the logic to operate in an insecure way, etc.

In some embodiments, scan, test, and/or debug logic 330 may be included within the boundary 316. In some embodiments, the scan, test, and/or debug logic may be operable to scan, test, and/or debug at least some or all of the logic 302 within the confines of the boundary. That is, the logic 302, or at least a portion thereof, may use the scan, test, and/or debug logic to perform a self-contained scan, test, and/or debug. The scanning or testing may allow determining whether or not the logic is functioning properly and/or as desired (e.g., whether or not there are one or more bugs). In some cases, if the logic is not functioning properly and/or as desired there may be certain capabilities to fix bugs e.g., by reconfiguring logic, disabling improperly functioning logic, etc., all from within the confines of the boundary. In some embodiments, the scan, test, and/or debug logic may include scan-based built in self test (BIST) and optional debug logic. Alternatively, in other embodiments, the scan, test, and/or debug logic 330 may optionally be omitted in embodiments where scanning, testing, and/or debugging the logic 102 is not required or is desired to be sacrificed in order to increase security.

Figure 4:
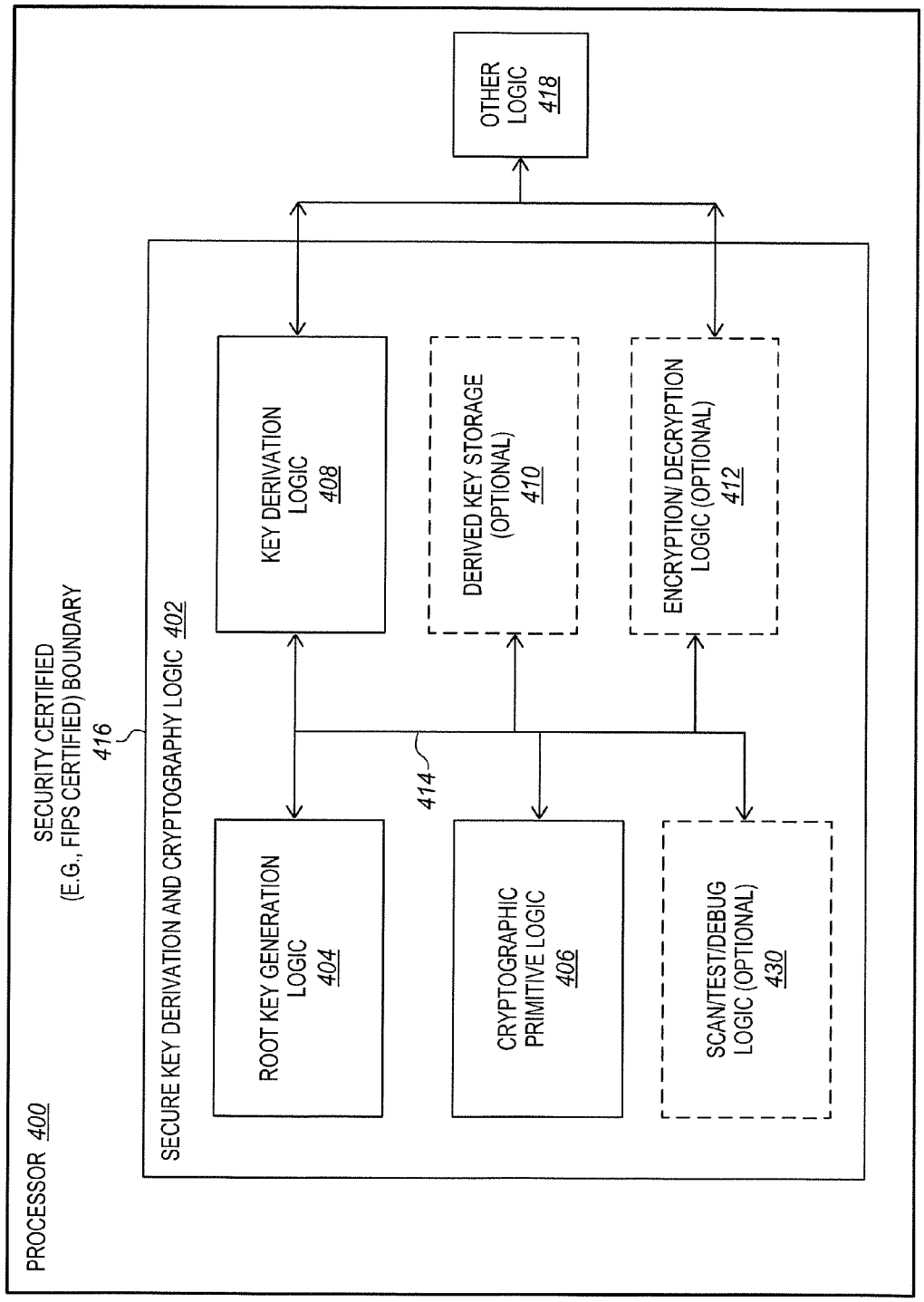
FIG. 4 is a block diagram of an embodiment of a processor having a secure key derivation and cryptography logic that optionally includes a physical and/or logical security certified boundary.

FIG. 4 is a block diagram of an embodiment of a processor 400 having a secure key derivation and cryptography logic 402 that optionally includes a physical and/or logical security certified boundary 416. The secure key derivation and cryptography logic 402 includes a root key generation logic 404, a cryptographic primitive logic 406, a key derivation logic 408, an optional derived key storage 410, an optional encryption/decryption logic 412, a local interconnect 414, and an optional scan, test, and/or debug logic 430. The processor also includes other logic 418. Each of these components may optionally have the same or similar characteristics as the correspondingly named components of the processor 100 of FIG. 1 and/or the processor 300 of FIG. 3. Moreover, in some embodiments, the root key generation logic 404 may be the same or similar to the logic of FIG. 2. To avoid obscuring the description primarily the different and/or additional structures and characteristics of the processor 400 of FIG. 4 will be described in detail below.

The security certified boundary 416 includes the secure key derivation and cryptography logic 402. In some embodiments, the security certified boundary is certified to be secure by a federal governmental institute, federal governmental agency, federal governmental regulatory authority, federal governmental standardization body, or the like. In some embodiments, the security certified boundary is certified to be secure by a reputable security association, standardization body, or the like. In some embodiments, the security certified boundary may represent a Federal Information Processing Standards (FIPS) certified boundary. In some embodiments, the FIPS certified boundary may be certified under FIPS Publication 140-2, published on May 25, 2001 and updated on Dec. 3, 2002, although this is not required.

In some embodiments, within the security certified boundary, all of the cryptographic algorithms (e.g., key derivation algorithms, encryption algorithms, decryption algorithms, hashing algorithms, etc.) may be standardized algorithms accepted by the entity certifying the security. In some embodiments, all or a majority of the algorithms may be U.S. National Institute of Standards and Technology (NIST) standardized algorithms, Federal Information Processing Standard (FIPS) standardized algorithms, or other U.S. federal government accepted standardized algorithms. In some embodiments, any of the algorithms not so standardized may be American National Standards Institute (ANSI), the International Organization for Standardization (ISO), the Institute of Electrical and Electronics Engineers (IEEE), or similarly standardized algorithms. In some embodiments, within the security certified boundary, all of the cryptographic algorithms may be suitable for FIPS certification of the boundary.

In some embodiments, logic within the security certified boundary may not be scanned, tested, and/or debugged by entities external to the security certified boundary. In some embodiments, internal scan, test, and/or debug logic 430 may be included within the boundary. Alternatively, in other embodiments, the internal scan, test, and/or debug logic may be omitted.

In some embodiments, all of the secure key derivation and cryptography logic 402 may be implemented in on-die or on-processor logic (i.e., hardware potentially with some firmware but not with any software). In some embodiments, all of the secure key derivation and cryptography logic may be implemented entirely in on-die or on-processor hardware logic.

Figure 5:
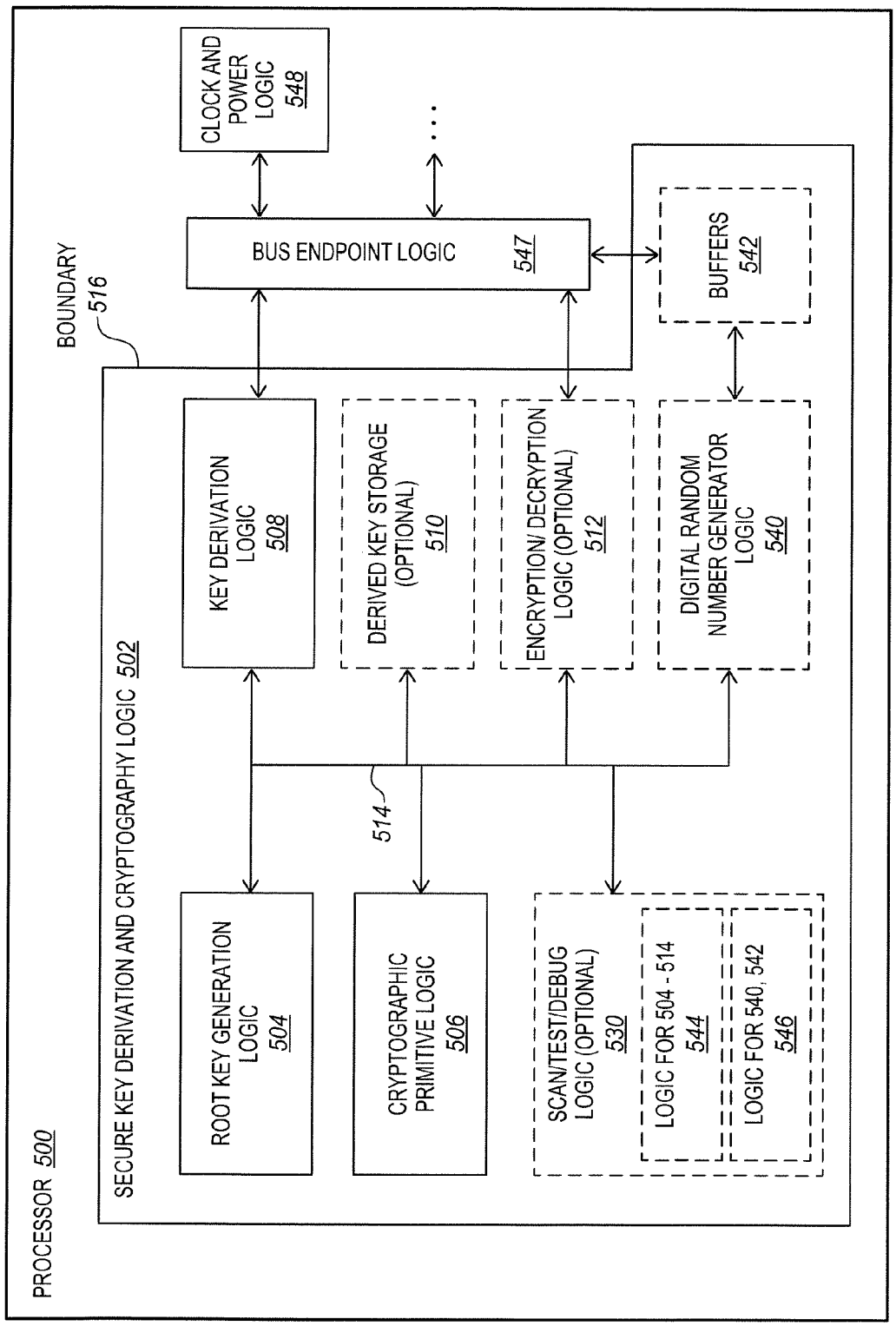
FIG. 5 is a block diagram of an embodiment of a processor having a secure key derivation and cryptography logic that optionally includes digital random number generator logic and associated buffers.

FIG. 5 is a block diagram of an embodiment of a processor 500 having a secure key derivation and cryptography logic 502 that optionally includes digital random number generator logic 540 and associated buffers 542. The secure key derivation and cryptography logic 502 includes root key generation logic 504, a cryptographic primitive logic 506, key derivation logic 508, an optional derived key storage 510, optional encryption/decryption logic 512, and a local interconnect 514. The processor also includes other logic 418. Each of these components may optionally have the same or similar characteristics as the correspondingly named components of the processor of FIG. 1. The secure key derivation and cryptography logic 502 also includes an optional scan, test, and/or debug logic 530 that may optionally have the same or similar characteristics as the scan, test, and/or debug logic of FIG. 3. The secure key derivation and cryptography logic 502 is included within a boundary 516. The boundary 516 may optionally have the same or similar characteristics as the boundary of FIG. 1 and/or the boundary of FIG. 3 and/or the boundary of FIG. 4. In some embodiments, the boundary 516 is a FIPS certified boundary although this is not required. To avoid obscuring the description primarily the different and/or additional structures and characteristics of the processor of FIG. 5 will be described in detail below.

The digital random number generator (DRNG) logic 540 and its associated buffers 542 are commonly included in processors or other integrated circuits. Suitable examples of DRNG logic and buffers are known in the arts. By way of example, they may be used to generate random keys. As shown, in some embodiments the DRNG logic and the buffers are included in the secure key derivation and cryptography logic 502 and/or within the boundary 516. One advantage of including the DRNG logic and the buffers in the logic 502 and/or within the boundary is an efficient implementation that allows reuse or sharing of certain logic by both the DRNG logic and other portions of the logic 502. Such reuse or sharing of logic may allow reducing the overall amount of logic (e.g. by avoiding replication of logic), which may help to reduce the manufacturing cost and power consumption of the integrated circuit, for example.

For example, in some embodiments, the cryptographic primitive logic 506 (e.g., block cipher logic) may be used and/or shared by both the DRNG logic 540 and one or more of the key derivation logic 508, the key derivation logic 508, and/or the encryption/decryption logic 512. As another example, in some embodiments, the scan, test, and/or debug logic 530 may be used and/or shared by both the DRNG logic 540 and one or more of the key derivation logic 508, the key derivation logic 508, and/or the encryption/decryption logic 512. In some embodiments, the scan, test, and/or debug logic may include a first portion of logic 544 to scan, test, and/or debug one or more of the logic 504-514 and a second portion of logic 546 to scan, test, and/or debug the logic 540 and 542. As a further example, in some embodiments, entropy extraction logic (e.g., entropy extraction logic 224) may be used and/or shared by both the PUF-based root key generation system and DRNG logic 540. The entropy source for the DRNG logic may not be perfect and may benefit from entropy extraction logic to improve or condition the entropy/randomness. Rather than replicating logic, entropy extraction logic may be shared or reused for both purposes. As yet another example, in some embodiments, the local interconnect 514 may be used and/or shared by both the DRNG logic 540 and one or more of the key derivation logic 508, the key derivation logic 508, and/or the encryption/decryption logic 512. As a still further example, in some embodiments, a bus endpoint logic 547, and clock and power (e.g. power gating) logic 548 may be used and/or shared by both the DRNG logic 540 and one or more of the key derivation logic 508, the key derivation logic 508, and/or the encryption/decryption logic 512.

Figure 6:
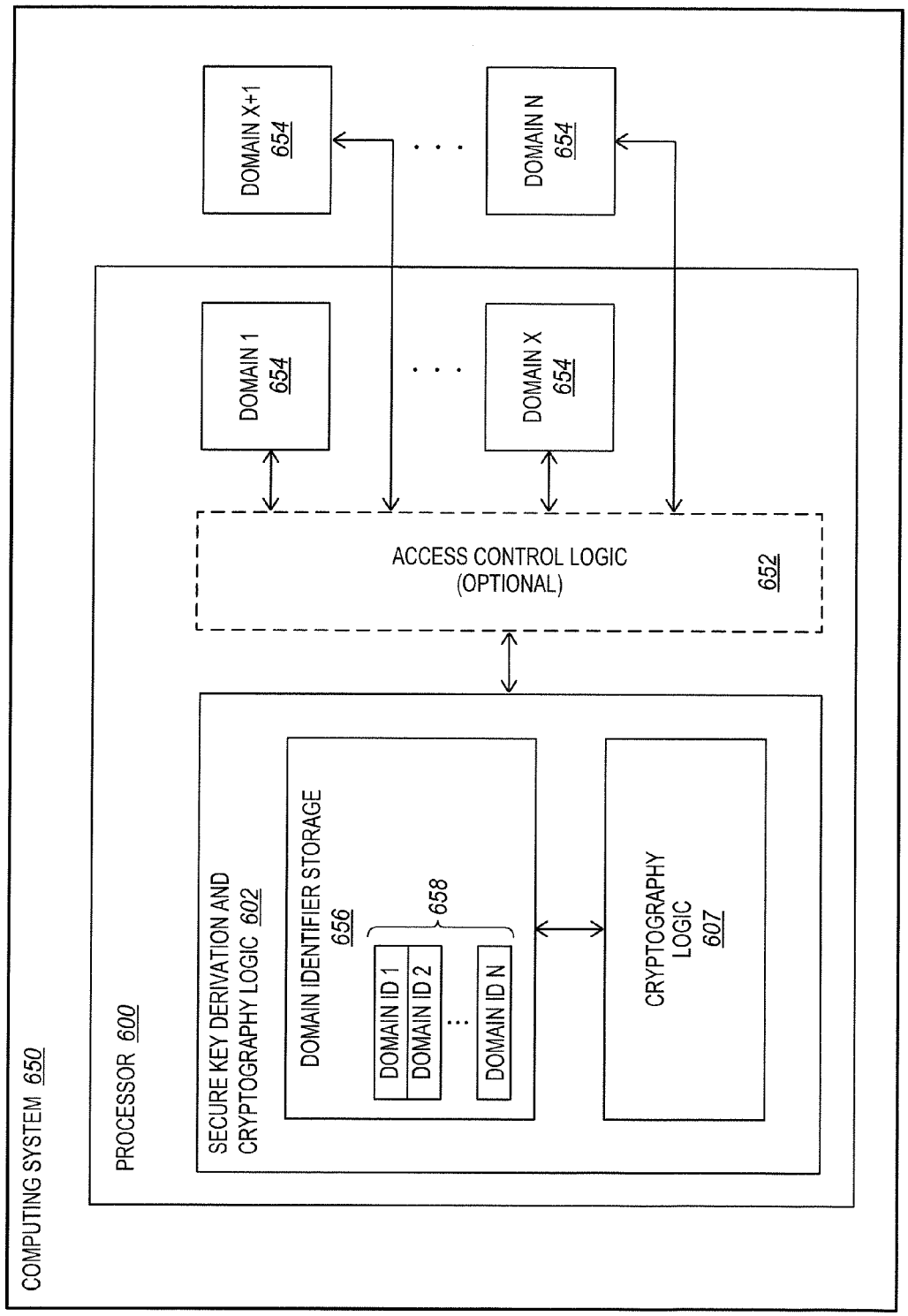
FIG. 6 is a block diagram of a computing system having a processor including secure key derivation and cryptography logic operable to provide cryptographically enforced domain separation.

FIG. 6 is a block diagram of a computing system 650 having a processor 600 including secure key derivation and cryptography logic 602 operable to provide cryptographically enforced domain separation. The secure key derivation and cryptography logic 602 may be used in any of the processors of FIG. 1, 3, 4, or 5. Alternatively, the secure key derivation and cryptography logic 602 may be used in similar or different processors. Moreover, the processors of FIG. 1, 3, 4, or 5 may use the same, similar, or different secure key derivation and cryptography logic than that of FIG. 6. In some embodiments, the secure key derivation and cryptography logic 602 may include the PUF-based root key generation logic of FIG. 2, although this is not required.

The processor and the computing system include multiple domains 654. As shown, some domains may be on-die or on-processor, such as domain 1 through domain X, whereas other domains may be off-die or off-processor but in the computing system, such as domains X+1 through domain N. The numbers X and N may be any appropriate numbers for the particular implementation (e.g., from several to on the order of many thousands). Any conventional processor-level or system-level component, logic, or entity may potentially be used as a domain. A few representative examples include, but are not limited to, threads, cores, hardware units, cryptographic logic, co-processors, graphics processors, graphics cards, communication cards, virtual machines, virtual machine monitors, security engines, cryptographic modules, sensor hubs, hardware IP blocks, and the like.

The secure key derivation and encryption logic 602 includes domain identifier storage 656. In the illustrated embodiment, the domain identifier storage 656 is optionally shown to be within the secure key derivation and cryptography logic 602, although this is not required. In other embodiments, the storage 656 may be located elsewhere, such as, for example, in the access control logic 652. The domain identifier storage includes or stores a different domain identifier (ID) 658 for each of multiple domains in the system. For example, there may be a domain ID 1 through a domain ID N each corresponding to a different one of N domains. By way of example, each of the different domain IDs may be a different predetermined static sequence of bits that is unique to that domain. By way of example, there may be on the order of from about five to on the order of tens of such bits per domain ID. These domain IDs may represent and be used as domain specific extra information to evaluate cryptographic algorithms. By way of example, these domain IDs may be stored in non-volatile memory within the secure key derivation and cryptographic logic (e.g., within a FIPS boundary, a debug disabled boundary, or other boundary around the secure key derivation and cryptography logic as disclosed elsewhere herein.

In some embodiments, the various domains 654 may access the secure key derivation and cryptography logic through optional access control logic 652 of the processor. Commonly, this is predominantly hardware logic to enforce domain separation and access control. Conventional access control logic known in the arts is suitable. The access control logic may help to enforce domain separation by preventing one domain from obtaining data intended for another domain. For example, if a first domain requests data, the access control logic may be able to provide the data to the first domain without allowing other domains to be able to obtain the data. By way of example, the access control logic may include a hardware filtering mechanism, for example at endpoints of a bus to which the domains are coupled, that is operable to selectively filter out the data to prevent it from being obtained by domains for which it is not intended. In some embodiments, the access control logic may be as described in U.S. patent application Ser. No. 12/890,040 entitled "METHOD FOR ENFORCING RESOURCE ACCESS CONTROL IN COMPUTER SYSTEMS, filed on Sep. 24, 2010 assigned to the assignee of the present application. Alternatively, other access control logic may be used instead. In still other embodiments, the access control logic may optionally be omitted.

In some embodiments, cryptographic logic 607 may use the domain IDs in order to help enforce domain separation. In some embodiments, the cryptographic logic 607 may include key derivation logic that is operable to derive one or more keys based on and/or dependent on the domain IDs. For example, when a given domain provides request for a key to the logic 602 (e.g., provides a derivation string), the key derivation logic may generate a key that is based on a given domain ID corresponding to that domain (e.g., the key derivation function may be evaluated with the provided derivation string and the given domain ID). Similarly, when other domains make requests for keys, the keys will be generated based on their corresponding different and unique domain IDs. By way of example, a first key derivation request from domain X with a personalization string of "793" would not be return the same derived key as a second key derivation request from domain N with a personalization string of "793," since the domains X and N would have different domain IDs that would be incorporated into the evaluation of the key derivation function. Advantageously, this may be used to provide domain separation based key derivation.

In some embodiments, the cryptographic logic 607 may include key derivation logic and/or other response generation logic that is operable to provide responses to challenges based on and/or dependent on the domain IDs. For example, a challenge from a given domain may induce a response that is based on the corresponding domain ID for that given domain (e.g., a key derivation algorithm may be evaluated based at least in part on the given domain ID corresponding to that domain). This may prevent different domains from getting the same responses to challenges.

In some embodiments, the cryptographic logic 607 may include encryption and/or decryption logic that is operable to encrypt and/or decrypt data based on and/or dependent on the domain IDs. For example, a request for encryption of plaintext data from a domain may be based on the corresponding domain ID for that domain (e.g., the encryption algorithm may be evaluated with the plaintext data and the given domain ID). As another example, a request for decryption of ciphertext from a domain may be based on the corresponding domain ID for that domain (e.g., the decryption algorithm may be evaluated with the ciphertext and the given domain ID).

Advantageously, the domain IDs and the cryptographic logic that is operable to use them may allow different domains to share the secure key derivation and cryptography logic while independently using its services with reduced risk of interference or cross-domain secret sharing. This may help to avoid or at least reduce the risks of privacy and/or platform serial number class of concerns. In some embodiments, the use of such domain IDs and cryptographically enforced domain separation may optionally be user configurable to be enabled or disabled.

Figure 7:
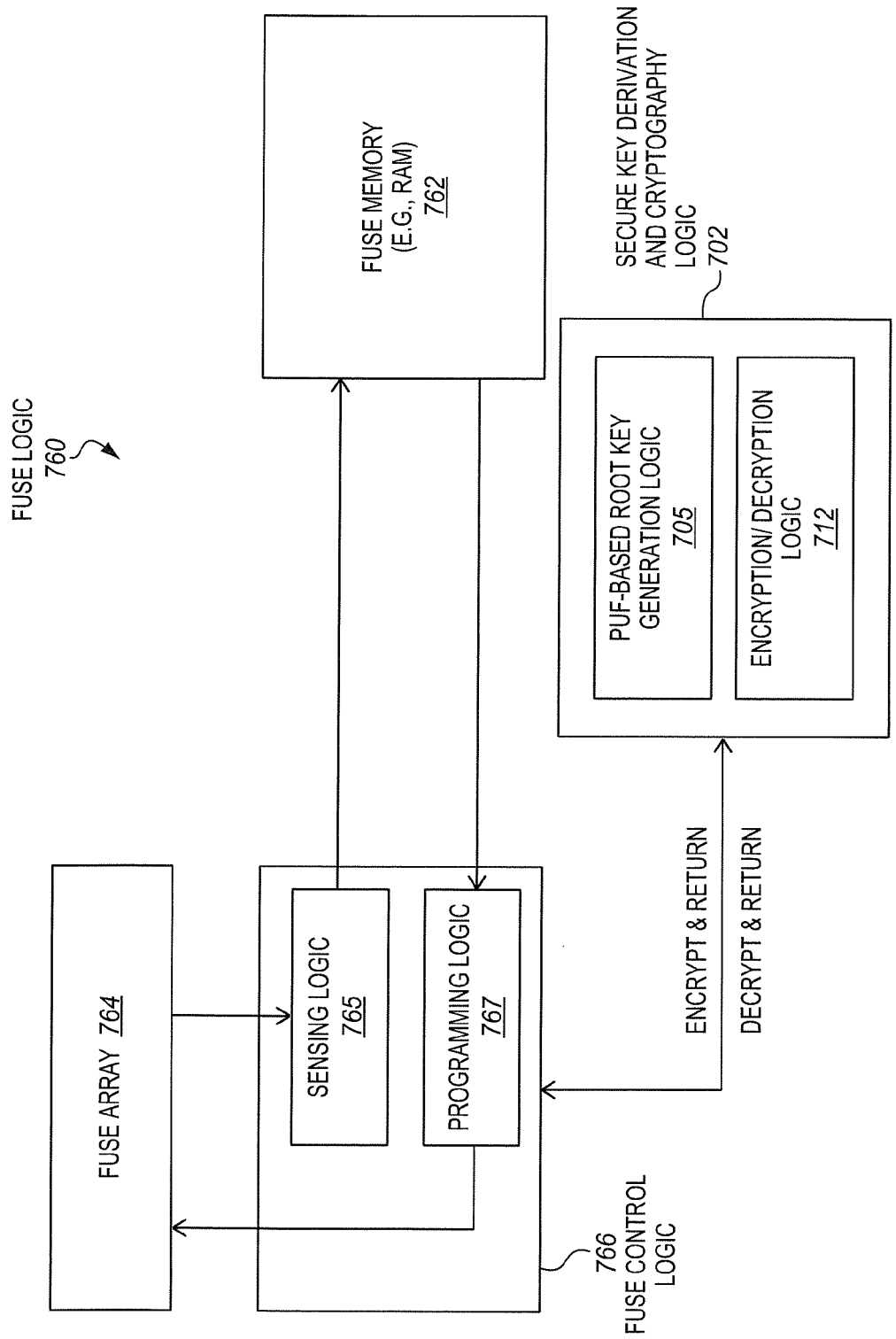
FIG. 7 is a block diagram of an embodiment of fuse logic operable to encrypt and decrypt fuse values with keys derived from PUF.

FIG. 7 is a block diagram of an embodiment of fuse logic 760 operable to encrypt and decrypt fuse values with keys derived from PUF. The fuse logic may be used in any of the processors of FIG. 1, 3, 4, 5, or 6. Alternatively, the fuse logic may be used in similar or different processors. Moreover, the processors of FIG. 1, 3, 4, 5, or 6 may use the same, similar, or different fuse logic than that of FIG. 7.

The fuse logic includes a fuse memory 762 that may include any of various types of random access memory (RAM), a fuse array 764 where fuses are to be burned or otherwise programmed, fuse control logic 766, and a secure key derivation and cryptography logic 702. The secure key derivation and cryptography logic 702 may be the same as, similar to, or different than that of the correspondingly named logic of FIG. 1, 3, 4, 5, or 6.

Fuse values to be programmed may be stored in the fuse memory 762. Before the fuse control logic programs them into the fuse array 764, the fuse values may be encrypted. The fuse values may be provided to the secure key derivation and cryptography logic 702. The encryption logic 712 thereof may encrypt the fuse values using one or more keys based on PUF root key from PUF-based root key generation logic 705. In some embodiments, a PUF root key may be used. In other embodiments, a key derived from a PUF root key may be used. In some embodiments, the PUF-based root key generation logic 705 may be the same as, similar to, or different than that of FIG. 2. The encrypted fuse values may be provided back to the fuse control logic which may use programming logic 767 to program the fuses into the fuse array. When the encrypted fuse values are read from the fuse array (e.g., after platform reset) by sensing logic 765, the fuse controller may provide the encrypted fuse values to the decryption logic 712 of the secure key derivation and cryptography logic 702. The decryption logic may decrypt the encrypted fuse values and provide the decrypted fuse values to the fuse control logic. The fuse control logic may write or store the decrypted fuse values to the fuse memory 762.

Advantageously, the encryption of the fuse values may help to protect keys stored in fuses from physical attacks. Even if an attacker is able to read the fuses they generally cannot learn the actual keys that are used, since the keys used are encrypted by the keys from the PUF-based secure key derivation and cryptography logic 702. In some embodiments, the fuse value encryption may be invisible to external entities (e.g., testers and probers or other manufacturing environment). In some embodiments, the fuse logic 760 may be included in a FIPS boundary, other security certified boundary, other debug disabled boundary, or other boundary as disclosed elsewhere herein.

To avoid obscuring the description, relatively simple processors have been shown and described. In other embodiments, the processors may optionally include other well-known components. Examples of such components include, but are not limited to, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other components included in processors, and various combinations thereof. Embodiments may have multiple cores, logical processors, or execution engines. There are literally numerous different combinations and configurations of components in processors, and embodiments are not limited to any particular combination or configuration. The processor may represent an integrated circuit or set of one or more semiconductor dies or chips (e.g., a single die or chip, or a package incorporating two or more die or chips). In some embodiments, the processor may represent a system-on-chip (SoC).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
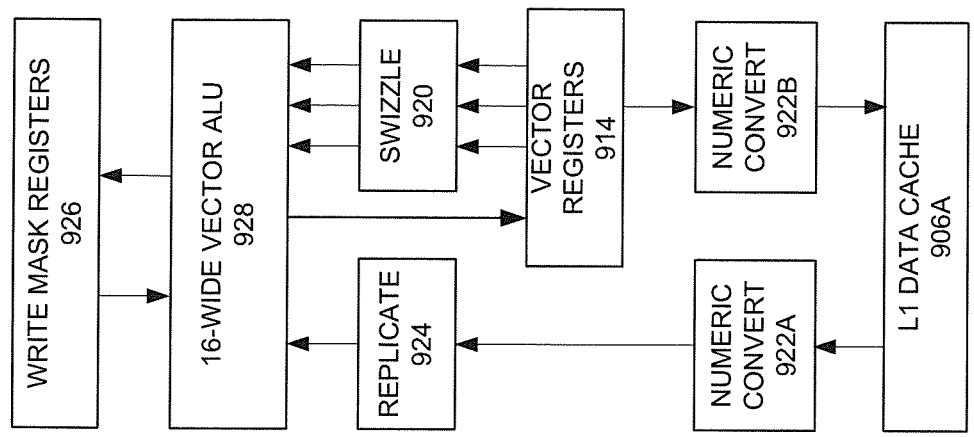
FIG. 9B is an expanded view of part of the processor core in FIG. 9A according to embodiments of the invention.
Figure 9A:
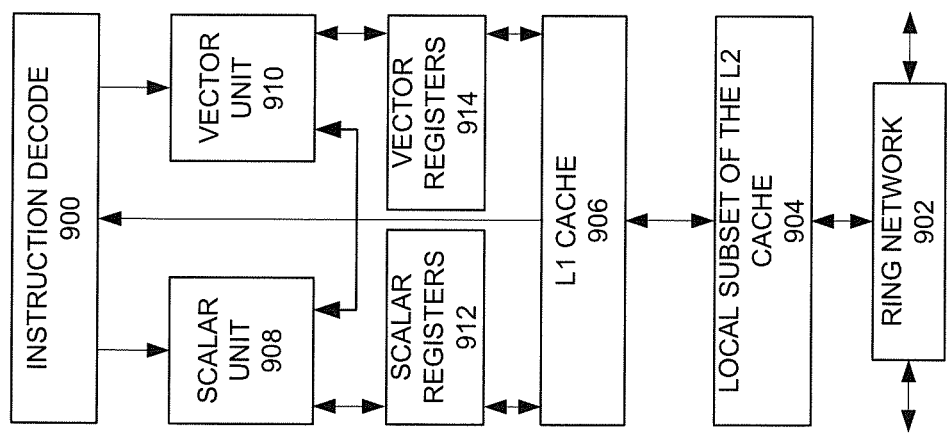
FIG. 9A is a block diagram of a single processor core, along with its connection to the on-die interconnect network and with its local subset of the Level 2 (L2) cache, according to embodiments of the invention.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bidirectional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
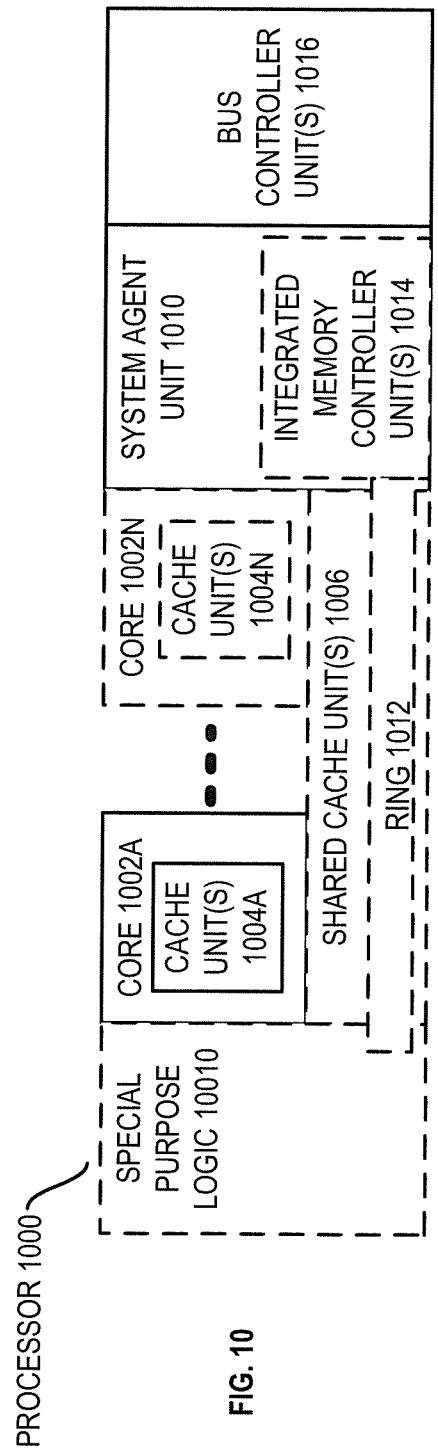
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
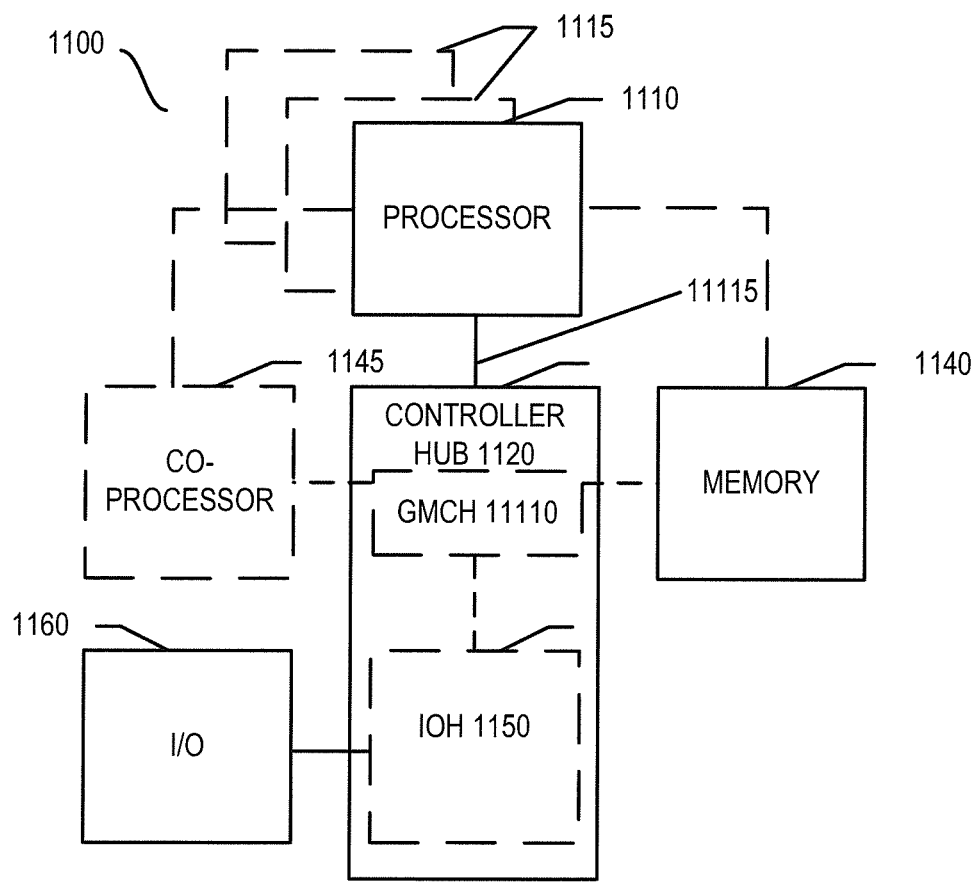
FIG. 11, shown is a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
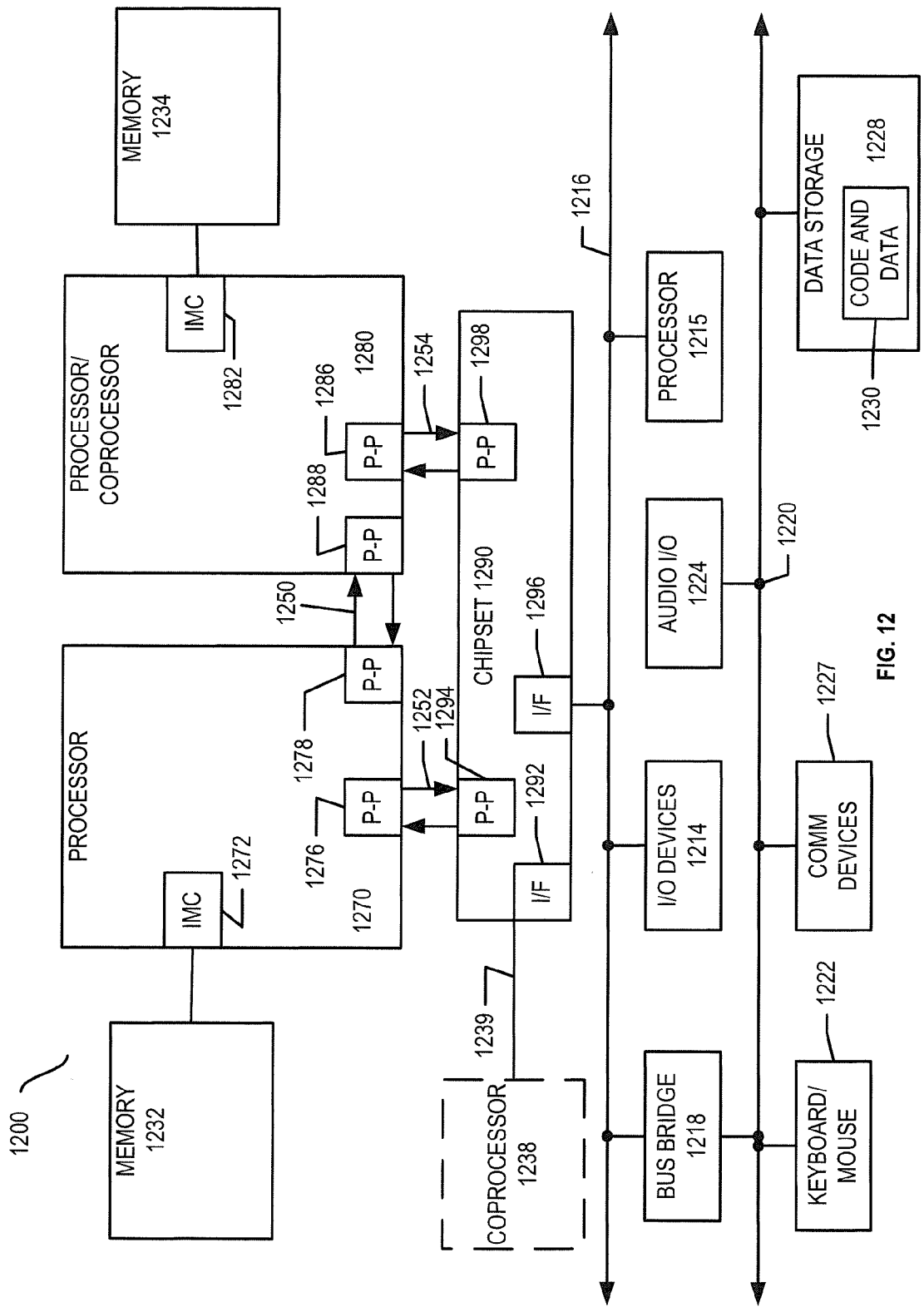
FIG. 12, shown is a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
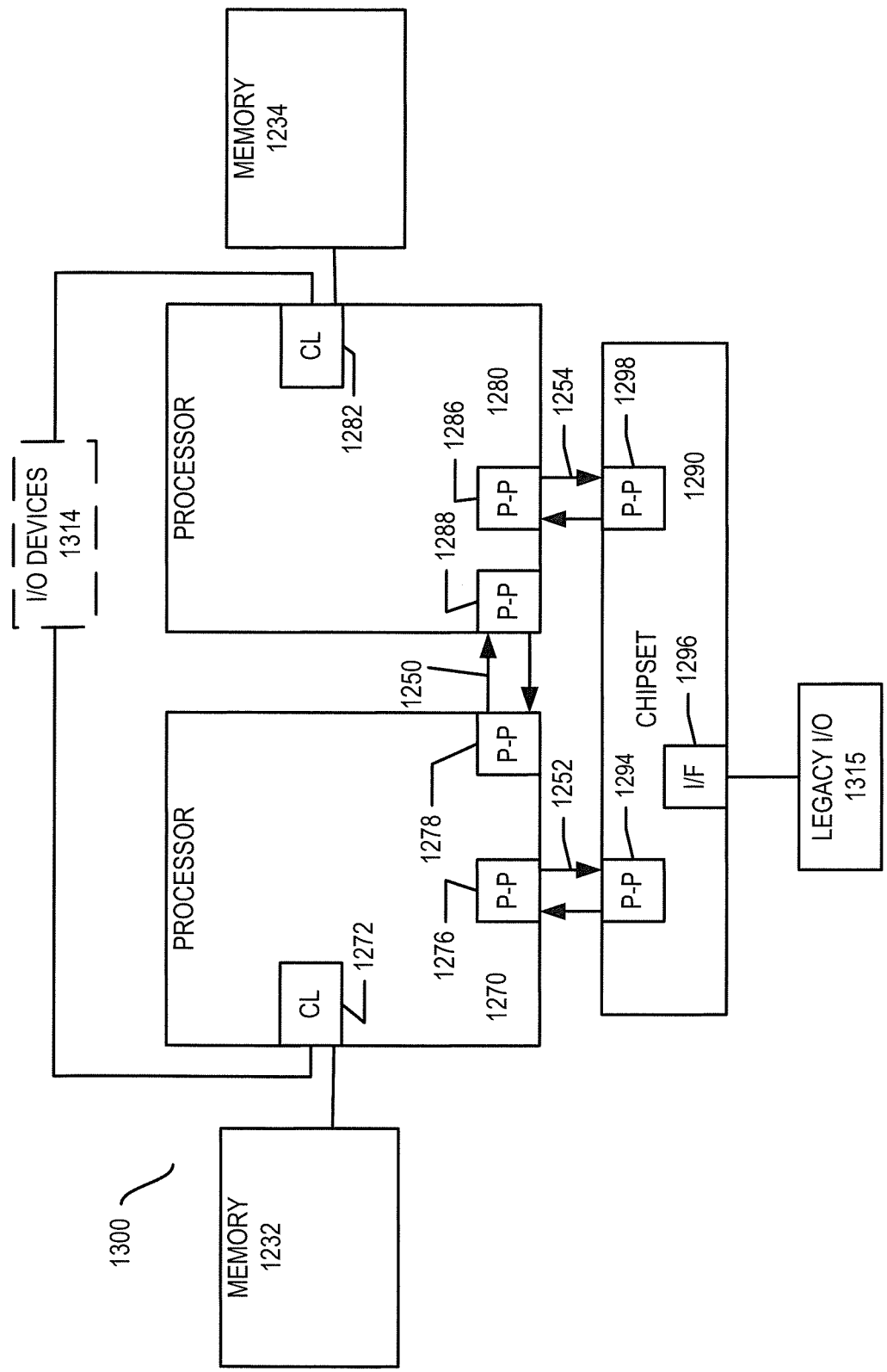
FIG. 13, shown is a block diagram of a second more specific exemplary system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
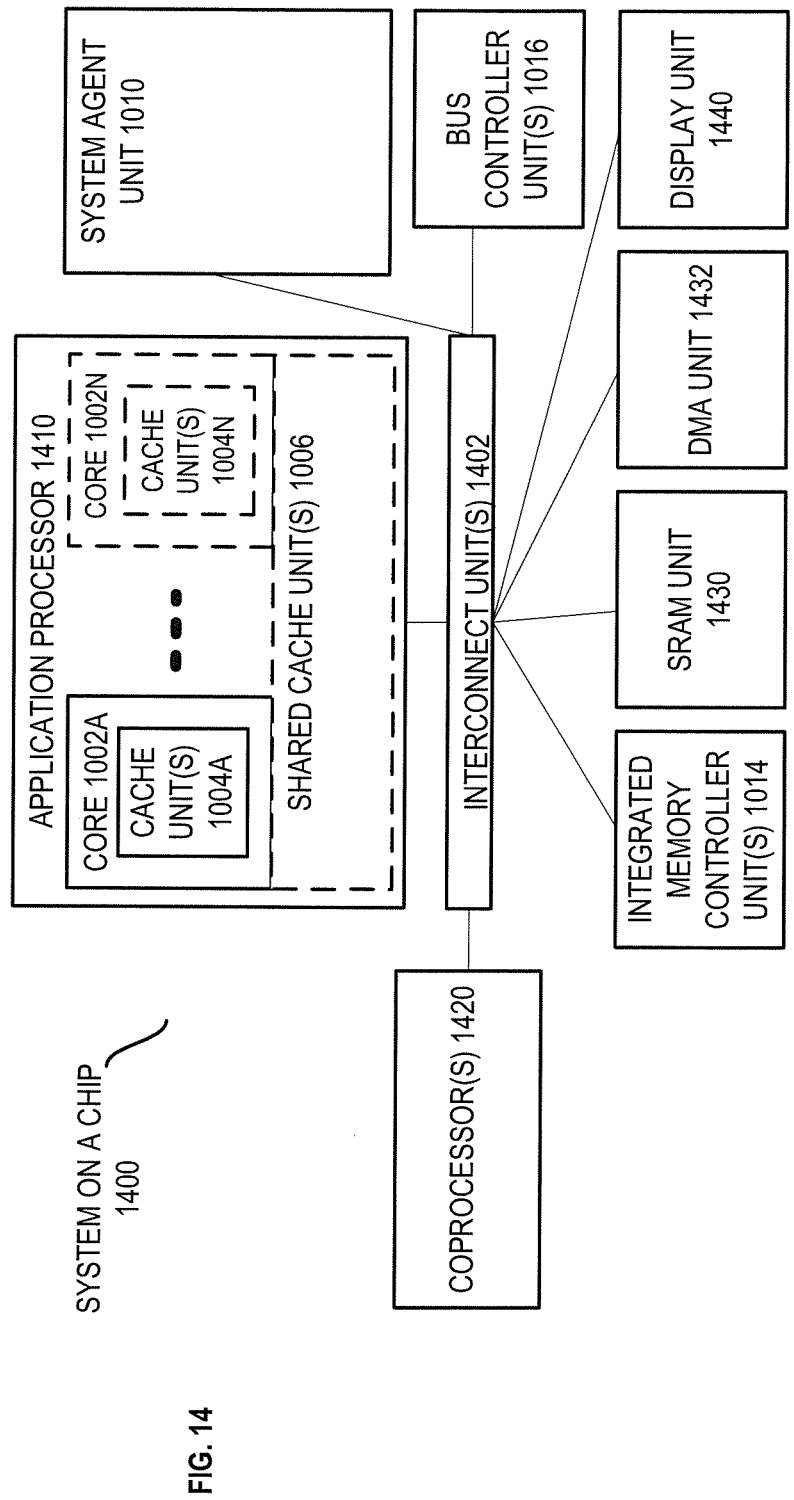
FIG. 14, shown is a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
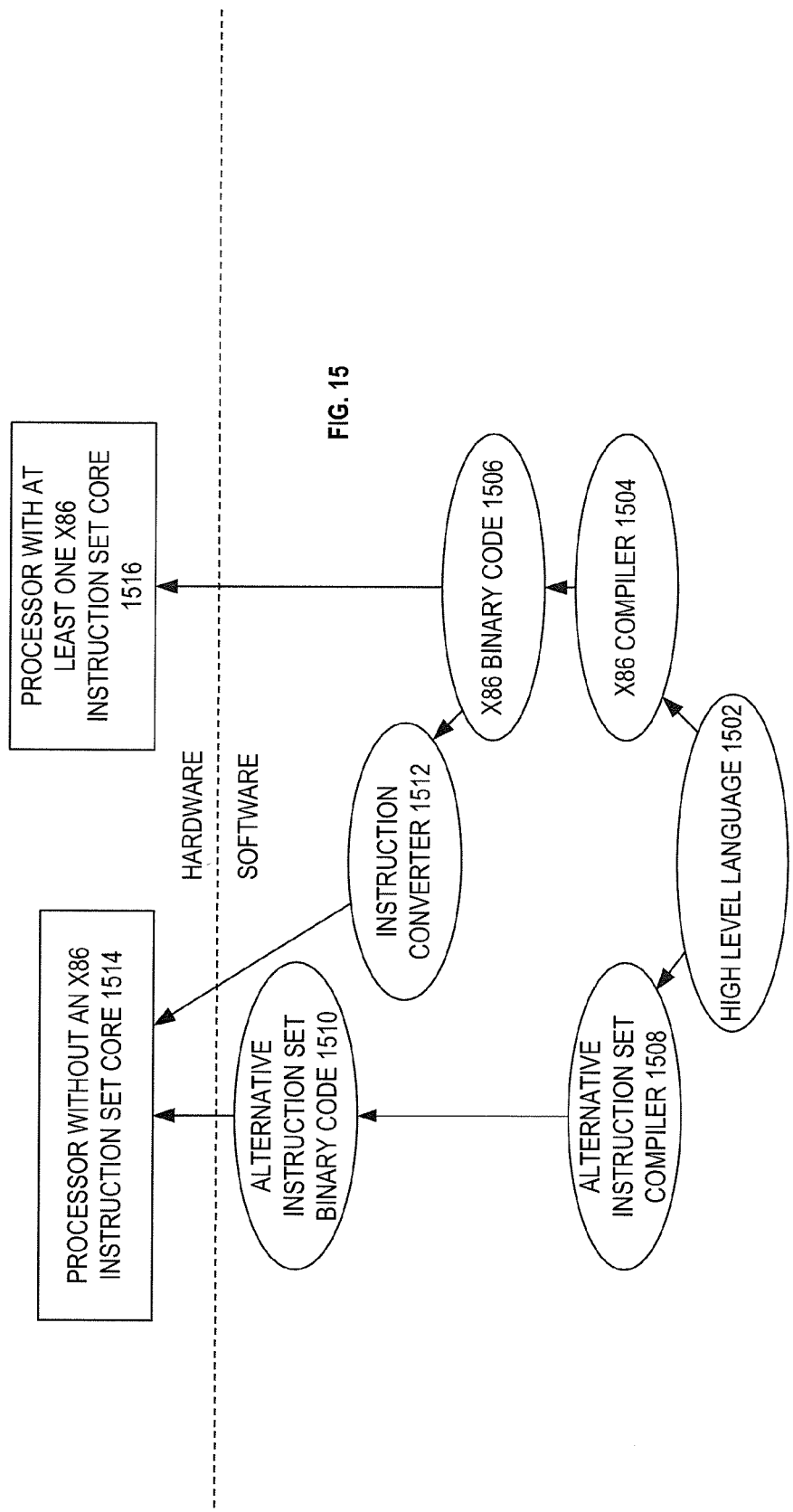
FIG. 15 is a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The term "and/or" may have been used. As used herein, the term "and/or" means one or the other or both (e.g., A and/or B means A or B or both A and B).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. All equivalent relationships to those illustrated in the drawings and described in the specification are encompassed within embodiments of the invention. In other instances, well-known circuits, structures, devices, and operations have been shown in block diagram form or without detail in order to avoid obscuring the understanding of the description.

Where considered appropriate, reference numerals and/or terminal portions of reference numerals have been repeated among the figures to indicate corresponding or analogous elements, which may optionally have similar or the same characteristics, unless specified or otherwise clearly apparent. In some cases, where multiple components have been shown and described, they may be incorporated into a single component. In other cases, where a single component has been shown and described, it may be separated into two or more components. In the drawings, arrows represent couplings and bidirectional arrows represent bidirectional couplings.

Various operations and methods have been described. Some of the methods have been described in a relatively basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated. The components, features, and specific optional details described herein for an apparatus also optionally apply to the methods described herein which may in embodiments be performed by and/or with such an apparatus.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method in a processor comprising:
   generating a root key within a security boundary of the processor from a source of static and entropic bits of the processor, wherein the source of the static and entropic bits is included on a die;
   deriving one or more keys from the root key within the security boundary of the processor and on the die; and
   performing cryptographic primitive operations based on the root key within the security boundary of the processor and on the die,
   wherein the processor comprises at least one general-purpose core.

2. The method of claim 1, wherein generating comprises generating the root key from physically unclonable function (PUF) bits.

3. The method of claim 2, further comprising performing error correction and entropy extraction on the PUF bits within the security boundary, and wherein deriving the one or more keys from the root key comprises deriving the one or more keys from the root key which has already undergone entropy extraction.

4. The method of claim 1, wherein generating comprises generating the root key from fuses.

5. The method of claim 1, further comprising testing logic used to perform the cryptographic primitive operations from within the security boundary, in which testing of the logic used to perform the cryptographic primitive operations from outside of the security boundary is disabled.

6. The method of claim 1, wherein deriving comprises deriving the one or more keys from the root key within a security boundary that is certified for security by a federal government.

7. The method of claim 6, wherein the security certified boundary comprises a Federal Information Processing Standards (FIPS) boundary.

8. The method of claim 1, wherein deriving comprises deriving keys from the root key within the security boundary for different domains based on different corresponding domain identifiers.

9. The method of claim 1, further comprising performing encryption and decryption using the one or more derived keys within the security boundary.

10. The method of claim 9, wherein generating comprises generating the root key from PUF bits, and further comprising:
    encrypting fuse values with keys derived from the PUF bits; and
    programming the encrypted fuse values in a fuse array.

11. A processor comprising:
    a die;
    root key generation logic of the processor and included on the die to generate a root key, the root key generation logic including a source of static and entropic bits;
    key derivation logic of the processor, included on the die, and coupled with the root key generation logic, the key derivation logic to derive one or more keys from the root key;
    cryptographic primitive logic of the processor, included on the die, and coupled with the root key generation logic to perform cryptographic operations; and
    a security boundary of the processor containing the root key generation logic, the key derivation logic, and the cryptographic primitive logic,
    wherein the processor is a central processing unit (CPU).

12. The processor of claim 11, further comprising at least one general-purpose core, and wherein the source of the static and entropic bits comprises physically unclonable function (PUF) to generate PUF bits.

13. The processor of claim 12, further comprising error correction logic and entropy extraction logic to respectively perform error correction and entropy extraction on the PUF bits, the error correction logic and the entropy extraction logic included within the security boundary, and wherein the root key from which the key derivation logic derives the one or more keys has already undergone entropy extraction by the entropy extraction logic.

14. The processor of claim 11, further comprising at least one general-purpose core, and wherein the source of the static and entropic bits comprises fuses.

15. The processor of claim 14, further comprising test logic within the security boundary to test at least the key derivation logic from within the security boundary.

16. The processor of claim 11, wherein there are no interconnects to allow access to logic state within the security boundary by external entities on external contacts of the processor to prevent scanning of the logic state by the external entities.

17. The processor of claim 11, further comprising at least one out-of-order core, and wherein the security boundary comprises a security certified boundary that is certified for security by a federal government.

18. The processor of claim 17, wherein the security certified boundary comprises a Federal Information Processing Standards (FIPS) certified boundary.

19. The processor of claim 11, further comprising at least one out-of-order core, and wherein the root key generation logic, the key derivation logic, and the cryptographic primitive logic consist essentially of hardware.

20. The processor of claim 11, further comprising a plurality of different domain identifiers each corresponding to a different domain, and wherein the key derivation logic is to derive different keys for the different domains based on the different corresponding domain identifiers.

21. The processor of claim 11, further comprising encryption and decryption logic to perform encryption and decryption using the one or more derived keys.

22. The processor of claim 21, wherein the root key generation logic comprises PUF-based root key generation logic, and further comprising fuse control logic to provide fuse values to the encryption and decryption logic and program encrypted fuse values, which have been encrypted by the encryption and decryption logic based on a PUF-based root key, in a fuse array.

23. The processor of claim 11, further comprising digital random number generator logic within the security boundary, wherein the digital random number generator logic and the key derivation logic are to share the cryptographic primitive logic.

24. The processor of claim 11, further comprising a register renaming unit, and wherein the root key generation logic, the key derivation logic, and the cryptographic primitive logic are part of a vertical, scalable, and reusable intellectual property block.

25. A system comprising:
an interconnect;
a processor coupled with the interconnect, the processor including:
a die;
at least one general-purpose core included on the die;
root key generation logic of the processor and included on the die to generate a root key, the root key generation logic including a source of static and entropic bits;
key derivation logic of the processor, included on the die, and coupled with the root key generation logic, the key derivation logic to derive one or more keys from the root key;
cryptographic primitive logic of the processor, included on the die, and coupled with the root key generation logic to perform cryptographic operations; and
a security boundary of the processor containing the root key generation logic, the key derivation logic, and the cryptographic primitive logic; and
a dynamic random access memory (DRAM) coupled with the interconnect.

26. The system of claim 25, wherein the source of the static and entropic bits comprises physically unclonable function (PUF) to generate PUF bits, and further comprising error correction logic and entropy extraction logic to respectively perform error correction and entropy extraction on the PUF bits, the error correction logic and the entropy extraction logic included within the security boundary.

27. The system of claim 25, further comprising test logic within the security boundary to test at least the key derivation logic from within the security boundary, and wherein the security boundary comprises a Federal Information Processing Standards (FIPS) certified boundary.

28. A processor comprising:
at least one out-of-order execution core;
root key generation logic to generate a root key, the root key generation logic including a source of static and entropic bits;
key derivation logic coupled with the root key generation logic, the key derivation logic to derive one or more keys from the root key, wherein the key derivation logic is to derive the one or more keys from the root key which is one of fuse values and PUF bits on which entropy extraction has already been performed;
encryption and decryption logic coupled with the root key generation logic to perform cryptographic operations; and
a security boundary containing the root key generation logic, the key derivation logic, and the encryption and decryption logic,
wherein the at least one out-of-order execution core, the root key generation logic, the key derivation logic, and the encryption and decryption logic are all included on a same die.

29. The processor of claim 28, wherein the processor is a central processing unit (CPU).

* * * * *